(12) United States Patent
Suzuki et al.

(10) Patent No.: US 10,048,079 B2
(45) Date of Patent: Aug. 14, 2018

(54) DESTINATION DETERMINATION DEVICE FOR VEHICLE AND DESTINATION DETERMINATION SYSTEM FOR VEHICLE

(71) Applicant: DENSO CORPORATION, Kariya, Aichi-pref. (JP)

(72) Inventors: Takamitsu Suzuki, Kariya (JP); Takahira Katoh, Kariya (JP); Takeshi Yamamoto, Kariya (JP); Yuuko Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/306,849

(22) PCT Filed: Jun. 2, 2015

(86) PCT No.: PCT/JP2015/002783
§ 371 (c)(1),
(2) Date: Oct. 26, 2016

(87) PCT Pub. No.: WO2015/194106
PCT Pub. Date: Dec. 23, 2015

(65) Prior Publication Data
US 2017/0045366 A1    Feb. 16, 2017

(30) Foreign Application Priority Data
Jun. 19, 2014 (JP) .................................. 2014-126416

(51) Int. Cl.
*G01C 21/34* (2006.01)
*G01C 21/36* (2006.01)
*G06F 17/30* (2006.01)

(52) U.S. Cl.
CPC ....... *G01C 21/3407* (2013.01); *G01C 21/362* (2013.01); *G01C 21/3605* (2013.01);
(Continued)

(58) Field of Classification Search
None
See application file for complete search history.

(56) References Cited

U.S. PATENT DOCUMENTS

2002/0046027 A1*  4/2002  Tamura ............. G01C 21/3608
                                                    704/250
2003/0120420 A1*  6/2003  D'Amico ............ G01C 21/165
                                                    701/400
(Continued)

FOREIGN PATENT DOCUMENTS

JP      2006195576 A     7/2006
JP      2008148998 A     7/2008
(Continued)

*Primary Examiner* — Rami Khatib
(74) *Attorney, Agent, or Firm* — Harness, Dickey & Pierce, P.L.C.

(57) ABSTRACT

A destination determination device for a vehicle includes: a communication unit that performs a wireless communication with a mobile terminal used by an occupant in the vehicle and having a destination search function; a search condition acquisition unit that acquires destination search conditions from the mobile terminal through the communication unit; a search unit that performs a destination search based on an AND search of a combined search condition in which a plurality of acquired destination search conditions are combined together when the search condition acquisition unit acquires the plurality of destination search condition; and a search result output unit that outputs a search result of the destination search performed by the search unit under the combined search condition.

7 Claims, 13 Drawing Sheets

(52) U.S. Cl.
CPC .... *G06F 17/3087* (2013.01); *G06F 17/30241* (2013.01); *G06F 17/30967* (2013.01)

(56) References Cited

U.S. PATENT DOCUMENTS

| | | | |
|---|---|---|---|
| 2005/0210021 A1* | 9/2005 | Miyazaki | G01C 21/3611 |
| 2006/0031207 A1* | 2/2006 | Bjarnestam | G06F 17/277 |
| 2009/0150354 A1* | 6/2009 | Kawauchi | G06F 17/30241 |
| 2012/0131170 A1* | 5/2012 | Spat | H04L 67/20 709/223 |
| 2016/0349067 A1* | 12/2016 | Fowe | G01C 21/3492 |

FOREIGN PATENT DOCUMENTS

| | | | |
|---|---|---|---|
| JP | 2008259043 A | 10/2008 |
| JP | 2008269480 A | 11/2008 |
| JP | 2009140316 A | 6/2009 |
| JP | 2010203844 A | 9/2010 |
| JP | 2011080824 A | 4/2011 |
| JP | 2012208369 A | 10/2012 |
| JP | 2013195230 A | 9/2013 |

\* cited by examiner

DESTINATION DETERMINATION DEVICE FOR VEHICLE AND DESTINATION DETERMINATION SYSTEM FOR VEHICLE

CROSS REFERENCE TO RELATED APPLICATIONS

This application is a U.S. National Phase Application under 35 U.S.C. 371 of International Application No. PCT/JP2015/002783 filed on Jun. 2, 2015 and published in Japanese as WO 2015/194106 A1 on Dec. 23, 2015. This application is based on and claims the benefit of priority from Japanese Patent Application No. 2014-126416 filed on Jun. 19, 2014. The entire disclosures of all of the above applications are incorporated herein by reference.

TECHNICAL FIELD

The present disclosure relates to a destination determination device for a vehicle and a destination determination system for a vehicle, which are used in a vehicle, receive search condition, obtain a search result, and determine a destination.

BACKGROUND ART

A technique that enables a search adapted to a preference of an individual has been known (Patent Literature 1).

Multiple occupants get on a vehicle. When the multiple occupants operate respective mobile terminals, search the destination, and obtain the destination search results adapted to the preferences of the respective occupants, the destination search results of the same number as that of the occupants are obtained. Naturally, the respective destination search results are normally different from each other. However, there is a need to determine one destination of the vehicle. Although it is conceivable to pass through the multiple destinations in order, there is a need to determine one destination to be initially directed even in such a case.

Therefore, when the multiple destination search results different from each other have been obtained, there is a problem that a labor is likely to be required until the destination is finally determined, such that the respective occupants have a discussion while checking the destination search results obtained by the respective occupants against each other, or again search the destination with a change in the condition so as to obtain the destination search result to which all of the occupants can agree.

PRIOR ART LITERATURES

Patent Literature

Patent Literature 1: JP-A-2008-148998

SUMMARY OF INVENTION

It is an object of the present disclosure to provide a destination determination device for a vehicle and a destination determination system for a vehicle, which are capable of determining a destination to which multiple occupants can agree with less effort when the multiple occupants get on a vehicle.

According to an aspect of the present disclosure, a destination determination device for a vehicle, used for the vehicle, includes: a communication unit that performs a wireless communication with a mobile terminal used by an occupant in the vehicle and having a destination search function; a search condition acquisition unit that acquires a plurality of destination search conditions from the mobile terminal through the communication unit; a search unit that performs a destination search based on an AND search of a combined search condition in which a plurality of acquired destination search conditions are combined together when the search condition acquisition unit acquires the plurality of destination search condition; and a search result output unit that outputs a search result of the destination search performed by the search unit under the combined search condition.

According to the above device, when the multiple occupants get on the vehicle, the destination to which the multiple occupants can agree can be determined with less effort.

According to another aspect of the present disclosure, a destination determination system for a vehicle includes: the vehicle destination determination device according to the aspect of the present disclosure; and the mobile terminal. The mobile terminal transmits the destination search conditions to the destination determination device every time receiving the destination search conditions. The search unit of the destination determination device performs the destination search every time the search condition acquisition unit acquires the destination search conditions. The search result output unit of the vehicle destination determination device outputs a numerical number of searches obtained by the destination search to the mobile terminal through the communication unit every time the search unit performs the destination search. The mobile terminal includes a display unit, and displays the numerical number of received searches on the display unit every time receiving the numerical number of searches.

According to the above system, when the multiple occupants get on the vehicle, the destination to which the multiple occupants can agree can be determined with less effort.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, embodiments of the present disclosure will be described with reference to the drawings. A vehicle destination determination system 1 according to an embodiment of the present disclosure includes a vehicle navigation apparatus 100 and mobile terminals 200 illustrated in FIG. 1. The vehicle navigation apparatus 100 functions as a vehicle destination determination device. The vehicle navigation apparatus 100 is fixed to a position operable from a driver's seat in a front portion of a vehicle interior of a vehicle 300. Unlike the above configuration, a navigation apparatus configured to be taken out from the vehicle 300 can be employed.

Figure 1:
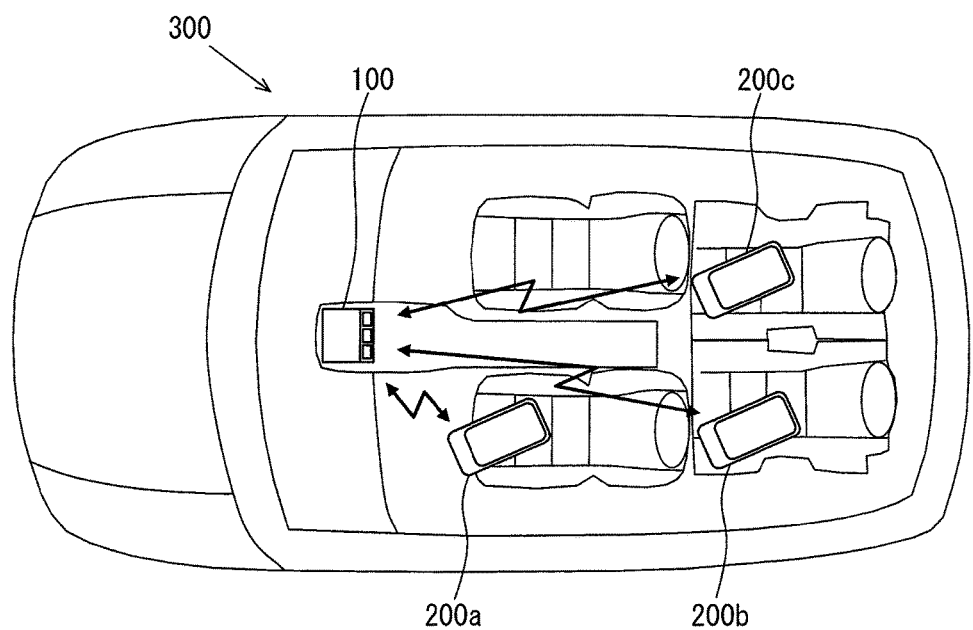
FIG. 1 is a configuration diagram of a vehicle destination determination system according to an embodiment of the present disclosure.

The mobile terminals 200 are carried by occupants who get on the vehicle 300, and brought into the vehicle 300. In FIG. 1, three mobile terminals 200a, 200b, and 200c are brought into the vehicle 300. When the mobile terminals 200a, 200b, and 200c are not distinguished from each other, those terminals are simplified as the mobile terminals 200. The mobile terminals 200 are configured by, for example, smartphones.

The vehicle navigation apparatus 100 and the mobile terminals 200 can wirelessly communicate with each other. The configurations of the vehicle navigation apparatus 100 and the mobile terminals 200 will be described with reference to FIGS. 2 and 3.

Figure 2:
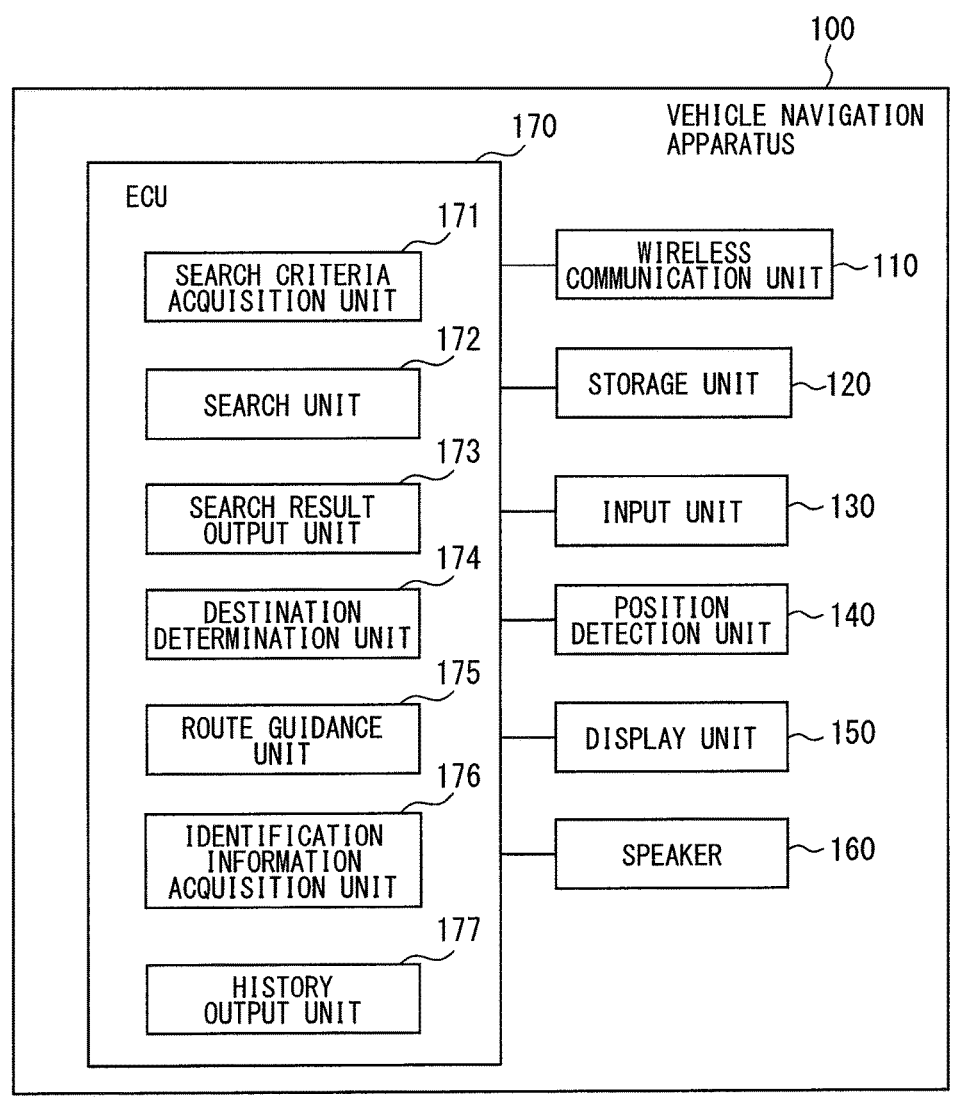
FIG. 2 is a block diagram illustrating a configuration of a vehicle navigation apparatus in FIG. 1.

As illustrated in FIG. 2, the vehicle navigation apparatus 100 includes a wireless communication unit 110, a storage unit 120, an input unit 130, a position detection unit 140, a display unit 150, a speaker 160, and an ECU 170.

The wireless communication unit 110 performs a wireless communication with a short-range wireless communication unit 210 (refer to FIG. 3) of the mobile terminals 200.

The storage unit 120 is a rewritable storage unit such as a flash memory. Road map data and a search history are stored in the storage unit 120. Therefore, the storage unit 120 corresponds to a search history storage unit. The search history includes combined search condition used for a destination determination, a destination, and terminal IDs and difference condition of the mobile terminals 200 that acquire the destination search condition used for creation of the combined search condition. The difference condition represent condition different from the combined search condition obtained by combining all of the destination search condition acquired from the mobile terminals 200 together, in the respective condition configuring the combined search condition used for the destination determination.

The input unit 130 is, for example, a touch panel or a mechanical switch, and can receive the search condition and a determination instruction for a destination determination.

The position detection unit 140 successively detects the present position of the vehicle 300. For example, the position detection unit 140 includes a GNSS receiver used in a GNSS (global navigation satellite system) for detecting a position of a subject device on the basis of radio waves from a satellite, and detects the present position on the basis of a signal received by the GNSS receiver.

A road map around the current position is displayed on the display unit 150. In a destination search mode, a search condition input screen and a search result screen are displayed.

A voice guidance for guiding a travel direction of the vehicle 300 is output from the speaker 160 during a route guidance.

The ECU 170 is a computer having a CPU, a ROM, and a RAM, and the CPU executes a program stored in the ROM with the use of a temporal storage function of the RAM whereby the ECU 170 functions as respective units illustrated in FIG. 2. In other words, the ECU 170 functions as a search condition acquisition unit 171, a search unit 172, a search result output unit 173, a destination determination unit 174, a route guidance unit 175, an identification information acquisition unit 176, and a history output unit 177. Incidentally, a part or all of functions to be executed by the ECU 170 may be configured by one or multiple ICs in a hardware configuration.

The search condition acquisition unit 171 acquires the destination search condition transmitted from the mobile terminals 200 through the wireless communication unit 110. In addition, the search condition acquisition unit 171 acquires the destination search condition input in the destination search performed in the vehicle navigation apparatus 100.

The search unit 172 creates combined search condition with the use of the destination search condition acquired by the search condition acquisition unit 171, and performs the destination search. When multiple destination candidates that meet the combined search condition are present, a result of the destination search includes the multiple destination candidates. A process of the search unit 172 will be described in detail with reference to FIG. 6 later.

The search result output unit 173 outputs the search result of the destination search performed by the search unit 172 to an output destination device. The output destination device includes the display unit 150 and the wireless communication unit 110. When the search result is output to the wireless communication unit 110, the search result is transmitted from the wireless communication unit 110 to the mobile terminals 200.

The destination determination unit 174 determines any destination candidate designated by destination determination operation of a user from the destination candidates included in the search result of the destination search performed by the search unit 172 as a destination.

The route guidance unit 175 performs the route guidance so that the vehicle 300 arrives at the destination determined by the destination determination unit 174 on the basis of the current position successively detected by the position detection unit 140 and the road map data stored in the storage unit 120.

The identification information acquisition unit 176 acquires a terminal ID, that is, identification information of the mobile terminal 200 that transmits the destination search condition through the wireless communication unit 110. The terminal ID is transmitted from the mobile terminals 200 together with the destination search condition.

The history output unit 177 outputs the search history in which the terminal ID of the mobile terminal 200 acquired by the identification information acquisition unit 176 matches the terminal ID stored in the storage unit 120 to the output destination device. The output destination device is identical with the output destination device described in the search result output unit 173, and includes the display unit 150 and the wireless communication unit 110.

Figure 3:
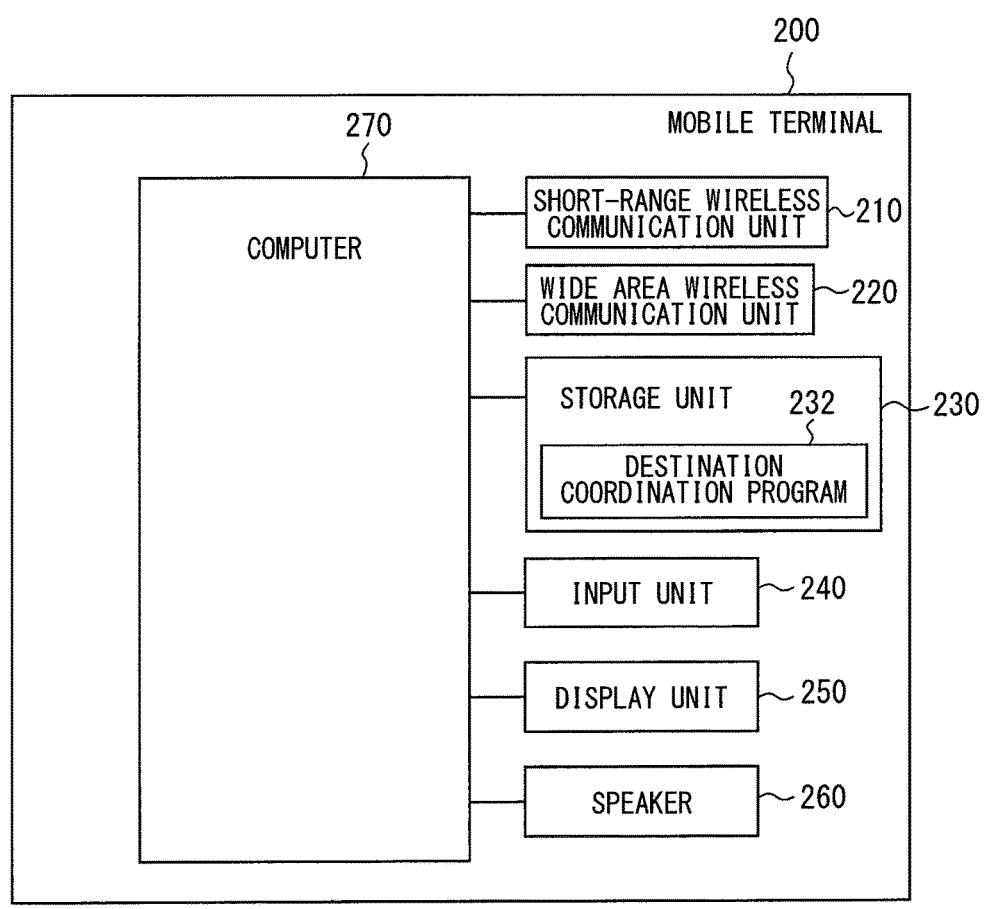
FIG. 3 is a block diagram illustrating a configuration of a mobile terminal in FIG. 1.

Subsequently, a configuration of the mobile terminals 200 will be described with reference to FIG. 3. Each of the mobile terminals 200 includes the short-range wireless communication unit 210, a wide area wireless communication unit 220, a storage unit 230, an input unit 240, a display unit 250, a speaker 260, and a computer 270.

The short-range wireless communication unit 210 has a communication range larger than a vehicle interior, for example, a communication range of about 10 m to several tens m, and performs a wireless communication with the wireless communication unit 110 of the vehicle navigation apparatus 100.

The wide area wireless communication unit 220 can be connected to a public communication network, and performs a wireless communication with another communication device connected through the public communication network.

The storage unit 230 is a rewritable storage unit such as a flash memory. A destination coordination program 232 is stored in the storage unit 230.

The input unit 240 is a touch panel, and used when the user inputs the search condition and a transmission instruction of the search condition.

The display unit 250 is a thin display such as a liquid crystal display, and a search condition input screen is displayed on the display unit 250. A variety of alarm sounds are output from the speaker 260.

The computer 270 includes a CPU, a ROM, and a RAM. The CPU executes the destination coordination program 232 with the use of a temporal storage function of the RAM whereby the computer 270 executes a process of FIG. 4.

Figure 4:
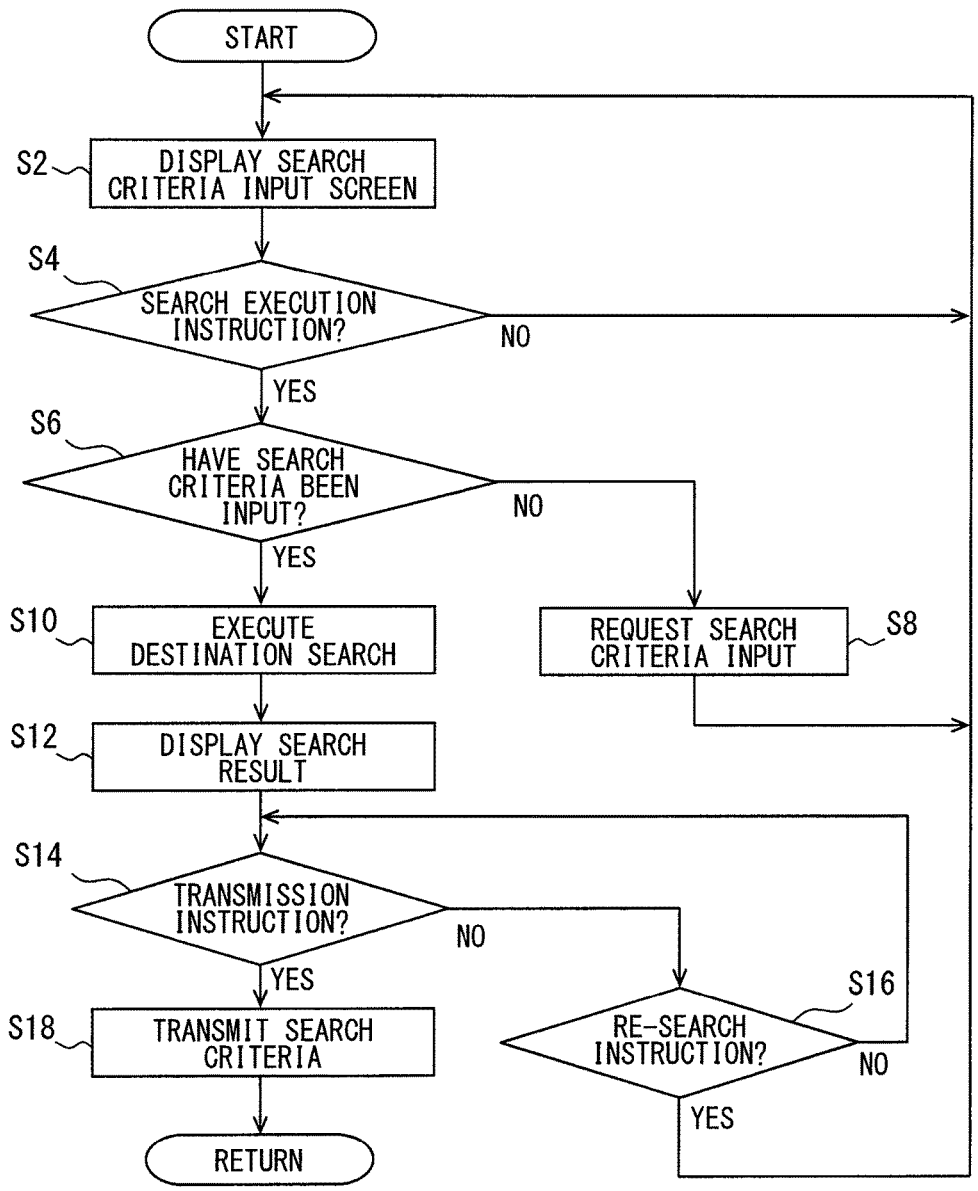
FIG. 4 is a flowchart illustrating a process to be executed by a computer of the mobile terminal in FIG. 3 according to a first embodiment.

The process of FIG. 4 is executed by inputting a destination coordination program execution instruction to the input unit 240. The destination coordination program execution instruction is input, for example, by touching a predetermined icon displayed on the display unit 250.

Figure 5:
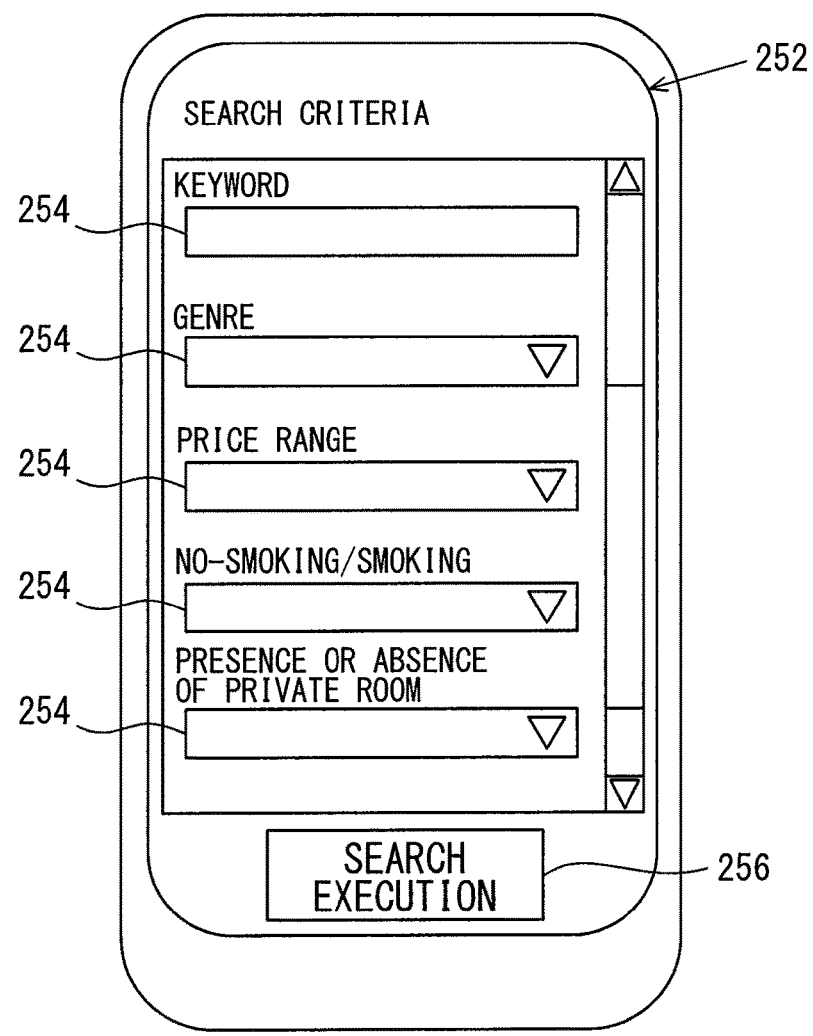
FIG. 5 is a diagram illustrating a display example in Step S12 of FIG. 4.

In FIG. 4, in Step S2, a search condition input screen 252 is displayed. FIG. 5 illustrates an example of the search condition input screen 252. Condition input fields 254 for inputting the destination search condition different from each other are shown in the search condition input screen 252 illustrated in FIG. 5. Specifically, the condition input fields 254 shown in FIG. 5 are condition input fields for inputting a keyword, a genre, a price range, non-smoking or smoking, or the presence or absence of a private room as the destination search condition. When the screen is scrolled, the other condition input fields 254 for inputting the other destination search condition are displayed. A search execution button 256 is also displayed on the search condition input screen 252.

The description is returned to FIG. 4. In Step S4, it is determined whether a search execution has been instructed from the user, or not. The determination is performed on the basis of whether the search execution button 256 has been operated, or not. If the search execution button 256 has been operated, a positive determination is made in Step S4, and if the search execution button 256 has not been operated, a negative determination is made in Step S4. If the determination in Step S4 is negative, the process returns to Step S2, and if the determination in Step S4 is positive, the process returns to Step S6.

In Step S6, it is determined whether the destination search condition has been input, or not. When the destination search condition is input to at least one of the multiple condition input fields 254, the determination in Step S6 is positive, and when the destination search conditions are input to none of the condition input fields 254, the determination in Step S6 is negative. When the determination in Step S6 is negative, the process proceeds to Step S8, and when the determination in Step S6 is positive, the process proceeds to Step S10.

In Step S8, a message requiring the destination search condition to be input is displayed on the display unit 250. After the execution of Step S8, the process returns to Step S2.

In Step S10, the destination search is performed with the use of the destination search condition input at that time. Therefore, the mobile terminals 200 that execute the process in FIG. 4 have a destination search function.

In the destination search of Step S10, an AND search is performed with the use of all the destination search condition input at that time. The destination search may be performed by a process for transmitting the destination search condition to a server with the use of the wide area wireless communication unit 220, performing the AND search by the server, and receiving the search result, or may be performed by a process to be executed in the mobile terminals 200.

In Step S12, the search result of the destination search performed in Step S10 is displayed on the display unit 250. The displayed search result includes the number of destination candidates that meet the destination search condition, names of the respective destination candidates, a transmission instruction button, and a re-search button.

In Step S14, it is determined whether the transmission instruction has been made by the user, or not. The determination is performed on the basis of whether a transmission instruction button displayed on the display unit 250 has been operated, or not. If the user checks the search result displayed on the display unit 250, and determines that the search result may be used to coordinate the destinations with others, the user depresses the transmission instruction button. If the user determines that the transmission instruction has not been made, the process proceeds to Step S16.

In Step S16, it is determined whether a re-search instruction has been performed from the user, or not. The determination is performed on the basis of whether the re-search button displayed on the display unit 250 has been operated, or not. If the user checks the search result displayed on the display unit 250, and determines that it is better to change the destination search condition, the user depresses the re-search button. If the user determines that the re-search instruction has not been made, the process returns to Step S14, and if the user determines that the re-search instruction has been made, the process returns to Step S2.

If it is determined in Step S14 that the transmission instruction has been made, the process proceeds to Step S18. In Step S18, the destination search condition used in the current destination search is transmitted to the vehicle navigation apparatus 100 with the use of the short-range wireless communication unit 210. If the destination search condition is input to the multiple condition input fields 254, and the multiple destination search conditions used in the destination search are present, all of the destination search conditions are transmitted to the vehicle navigation apparatus 100. In addition, the terminal IDs of the mobile terminals 200 are transmitted together with the destination search condition.

Figure 6:
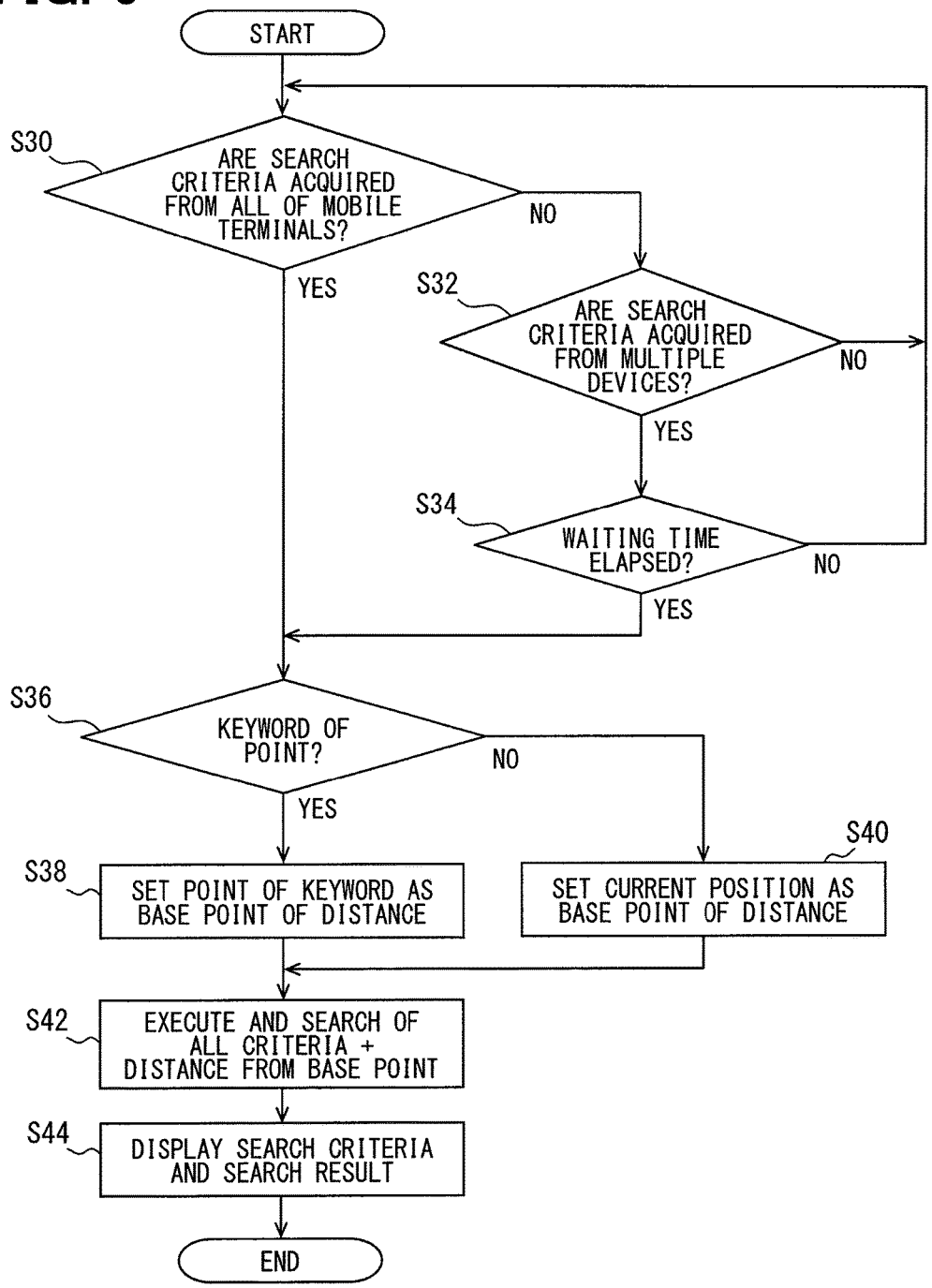
FIG. 6 is a flowchart illustrating a process to be executed by an ECU of the vehicle navigation apparatus in FIG. 2 according to the first embodiment.

Next, a process performed by the search unit 172 and the search result output unit 173 in the ECU 170 of the vehicle navigation apparatus 100 will be described with reference to FIG. 6. The process illustrated in FIG. 6 is executed when a destination search instruction has been made by allowing the user to operate the input unit 130. In respective steps in FIG. 6, Step S44 is executed by the search result output unit 173, and the other steps are executed by the search unit 172.

In Step S30, it is determined whether the destination search condition has been acquired from all of the mobile terminals 200 brought into the vehicle 300, or not. In the present embodiment, when a pairing process is performed between the mobile terminals 200 and the vehicle navigation apparatus 100 in advance, the vehicle navigation apparatus 100 has a function of automatically recognizing the presence of the mobile terminals 200 brought into the vehicle 300.

In Step S30, it is determined whether the destination search condition has been acquired from all of the mobile terminals 200 that could be recognized to be brought into the vehicle 300, or not. If the determination in Step S30 is negative, the process proceeds to Step S32, and if the determination in Step S30 is positive, the process proceeds to Step S36.

In Step S32, it is determined whether the destination search condition have been acquired from the multiple devices, or not. In this example, the device includes not only the mobile terminals 200 but also the vehicle navigation apparatus 100. If the determination in Step S32 is negative, the process returns to Step S30, and if the determination in Step S32 is positive, the process proceeds to Step S34.

In Step S34, it is determined whether a waiting time has been elapsed after it is first determined that the destination search condition have been acquired from the multiple devices, or not. The determination is provided to enable Step S36 and the subsequent steps to be executed even if some users determine that there is no need to participate in coordinating the destination, and determine that the destination search conditions are not transmitted from the mobile terminals 200 of those users. If the determination in Step S34 is negative, the process returns to Step S30, and if the determination in Step S34 is positive, the process proceeds to Step S36. Similarly, if the determination in Step S30 is positive, the process proceeds to Step S36.

In Step S36, it is determined whether a keyword indicative of a point is present in the acquired destination search condition, or not. If the determination is positive, the process proceeds to Step S38, and if the determination is negative, the process proceeds to Step S40.

In Step S38, the point included as the keyword is determined as a base point of a distance. On the contrary, in Step S40, the current position is determined as the base point of the distance.

In Step S42, a condition that a distance from the base point falls within a first distance is added to all of the acquired search condition to create the combined search condition, and the destination search that AND searches the respective search condition included in the combined search condition is executed. The first distance is indicative of a distance as long as many people may travel by a vehicle, and is set to, for example, about 50 km. The first distance may be changed by the user.

In Step S44, the search result screen is displayed on the display unit 150. The search result screen includes all of the search condition used in the search in Step S42 and the search result.

Figure 7:
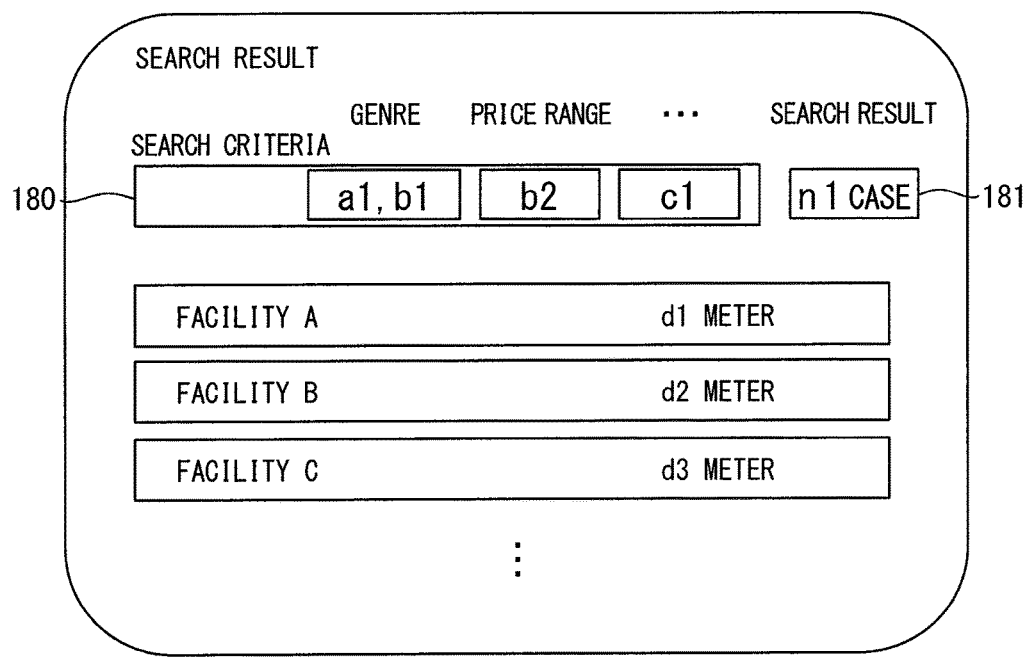
FIG. 7 is a diagram illustrating a display example in Step S44 of FIG. 6.

FIG. 7 illustrates an example of the search result screen. In an example of FIG. 7, a search condition display field 180 is displayed, and the combined search conditions for the destination search are shown in the search condition display field 180. In the search condition display field 180 of FIG. 7, two search condition a1 and b1 are set in a genre, one search condition b2 is set in a price range, and another search condition c1 is set for a search condition of a type different from the above condition. The search condition a1 is a search condition acquired from the mobile terminal 200a, the search condition b1 and b2 are search condition acquired from the mobile terminal 200b, and the search condition c1 is a search condition acquired from the mobile terminal 200c.

A search volume display field 181 indicative of the number of destination candidates that meet the combined search condition is displayed next to the search condition display field 180. The destination candidates that meet the combined search conditions are displayed below the search condition display field 180 and the search volume display field 181 in the ascending order of the distance from the base point.

After the search result screen has been displayed, the occupants of the vehicle 300 perform a discussion while viewing the search result screen, and set one destination candidate as a destination of the route guidance.

Hereinafter, the advantages obtained by the first embodiment will be described. According to the present embodiment, the search unit 172 creates the combined search condition including all of the destination search condition acquired from the multiple devices, and performs the AND search of the combined search condition as the destination search (S42).

The destination search condition acquired from the respective devices should be the condition under which the destination candidates that match the preferences of the users using the respective device are obtained. Therefore, the destination candidates included in the search result of the destination search for performing the AND search under the combined search condition obtained by combining the destination search condition acquired from the multiple devices together should be the destination candidates that match the preferences of all of the multiple occupants who set the destination search condition, separately.

For that reason, the possibility that the destination to which all of the occupants can agree can be immediately determined is high in the discussion performed by the respective occupants while viewing the search result screen, and cases in which the conditions are again changed to search the destination so as to obtain the destination search result to which all of the occupants can agree are reduced. Therefore, the destination to which the multiple occupants can agree can be determined with less effort.

In addition, since the destination search is performed under a set of destination search conditions that are the combined search condition, the respective occupants are not required to check the different destination search results obtained by the respective occupants against each other unlike the case in which the destination search is performed under the destination search condition different depending on the individual mobile terminals 200. Also, from the above viewpoint, an effort to determine the destination to which the multiple occupants can agree is reduced.

In addition, in the present embodiment, the condition in which the distance from the base point falls within the first distance is added to the combined search condition (S42). In order to determine the destination in the vehicle 300, although the distance is a significant condition, the condition of the distance may not be included in the destination search in the mobile terminals 200. Under the circumstance, in the present embodiment, the condition of the distance is added to the acquired destination search condition. As a result, since the search result including no destination candidates which are long in the distance from the base point and unlikely to be set as a final destination are obtained, the final destination is easily determined.

In the present disclosure, the search unit 172 performs the destination search through the AND search of the combined search condition. Since the combined search conditions are search in which the multiple destination search conditions are combined together, the combined search conditions are the search condition in which the destination search condition used by the multiple occupants are combined together. Therefore, the destination candidate to which the multiple occupants can agree is likely to be included in the search result of the destination search under the combined search condition.

As described above, the search result that is likely to include the destination candidate to which the multiple occupants can agree is obtained by the destination search under the combined search condition. For that reason, cases in which the respective occupants perform a discussion while checking the destination search results obtained by the respective occupants against each other, or the conditions are again changed so as to obtain the destination search result to which all of the occupants can agree to perform the destination search are reduced. Therefore, the destination to which the multiple occupants can agree can be determined with less effort.

(Second Embodiment)

Next, a second embodiment will be described. In the second embodiment and the subsequent embodiments, elements having symbols of the same numbers as those of the symbols used up to now are identical with the elements having the same symbols in the previous embodiment except as otherwise stated. When only a part of a configuration is described, the embodiment described previously can be applied to the other parts of the configuration.

Figure 8:
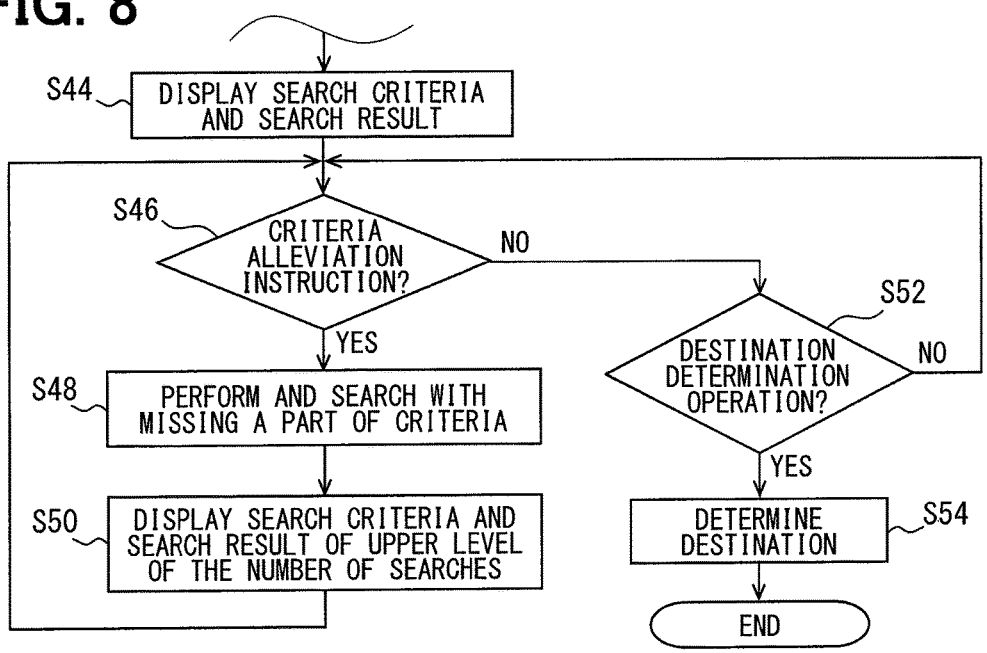
FIG. 8 is a flowchart illustrating a part of a process to be executed by an ECU of a vehicle navigation apparatus according to a second embodiment.

In the second embodiment, as illustrated in FIG. 8, Step S46 and the subsequent steps are executed following Step S44. In the respective steps illustrated in FIG. 8, Steps S46 and S48 are performed by the search unit 172, Step S50 is performed by the search result output unit 173, and Steps S52 and S54 are performed by the destination determination unit 174.

In Step S46, it is determined whether a condition alleviation instruction has been performed from the user, or not. The condition alleviation instruction to be performed by the user is determined, for example, according to whether a button has been operated, or not, in a state where the button for the user to give an instruction of the condition alleviation is displayed on the search result screen.

As described in the first embodiment, the destination candidates included in the search result of the destination search performed in Step S42 should be the destination candidates that meet the preferences of all of the multiple occupants. However, there is the possibility that the number of destination candidates that meet the preferences of all of the multiple occupants is 0. Even if the number of destination candidates is one or more, when the destination candidates are actually viewed, the destination candidates may be likely to be different from an expected destination. In those cases, the user gives the condition alleviation instruction. If the determination in Step S46 is negative, the process proceeds to Step S48.

In Step S48, a part of the respective search condition included in the combined search condition created in Step S42 is missed to execute the AND search. For example, one condition of the combined search condition created in Step S42 is missed to create new combined search condition. The new combined search condition is created by sequentially switching one search condition missed from the combined search condition created in Step S42, and missing all of the search condition one by one. The AND search is performed under the new combined search condition every time the new combined search conditions are created.

In Step S50, in the multiple search results performed in Step S48, a predetermined number of combined search condition and the search result under those conditions are displayed on the display unit 150 in the descending order of the number of destination candidates that meet the condition.

Figure 9:
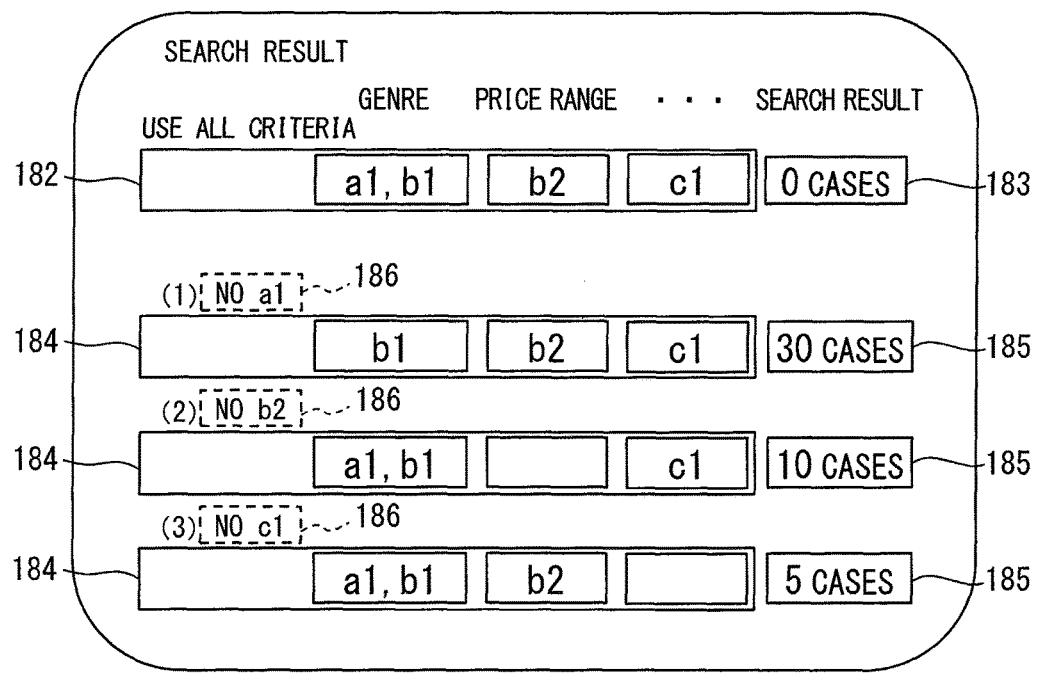
FIG. 9 is a diagram illustrating a display example in Step S50 of FIG. 8.

FIG. 9 illustrates a display example displayed on the display unit 150 in Step S50. In the display example of FIG. 9, an all-condition display field 182 that is a display field indicative of the combined search condition created in Step S42, and a search volume display field 183 indicative of the number of searches in the search performed in the combined search condition indicated in the all-condition display field 182 are displayed on a top of the screen.

Missing search condition display fields 184 and search volume display fields 185 are displayed below the all-condition display field 182 and the search volume display field 183. Each of the missing search condition display fields 184 is a field for indicating the search condition of the AND search performed in Step S48. Each of the search volume display fields 185 is a field for indicating the number of searches in the search performed under the search condition shown in the missing search condition display field 184. In an example of FIG. 9, in order to indicate the search condition and the number of searches in three searches larger in the number of destination candidates that meet the search condition, the missing search condition display fields 184 and the search volume display fields 185 are displayed three by three.

If the missing search condition display fields 184 are compared with the all-condition display field 182, it is found that which of the combined search condition shown in the all-condition display field 182 is missed from the combined search condition shown in the missing search condition display fields 184. However, missing condition display fields 186 are provided above the respective missing search condition display fields 184. Each of the missing condition display fields 186 is a field for indicating the search condition (hereinafter referred to as "missing condition") missing from the combined search condition shown in the corresponding missing search condition display field 184 in the search condition shown in the all-condition display field 182. The occupants can determine the missing condition immediately while viewing the missing condition display fields 186.

In the example of FIG. 9, it is found that the missing condition is a1 in the combined condition shown in the top missing search condition display field 184. In addition, it is found that the missing condition is b2 in the combined search condition shown in the middle missing search condition display field 184, and the missing condition is c1 in the combined condition shown in the bottom missing search condition display field 184.

It is found from the display contents displayed in the missing condition display fields 186 and the search volume display fields 185 that the number of searches is largest when a1 is missing. As a result, it is found that if a certain search condition is missing, it is most effective to miss a1.

After the execution of Step S50, the process returns to Step S46. The search results displayed in Step 50 are larger in the number of searches than the search results obtained in Step S42. Therefore, the destination candidate to which all of the multiple occupants can agree is more likely to be included in the search result displayed in Step S50 than the search result displayed in Step S44.

Incidentally, in the example of FIG. 9, specific destination candidates are not displayed. The specific destination candidates are displayed with the selection of the missing search condition display fields 184 or the search volume display fields 185. When the specific destination candidates are viewed by all of the occupants, and the destination candidate to which all of the occupants can agree is included in the destination candidates, the occupants perform destination determination operation. Since the occupant does not perform the condition alleviation instruction, the determination in Step S46 is negative, and the process proceeds to Step S52. When the occupant performs the condition alleviation instruction plural times, the occupant further creates new combined search condition from which one search condition is missing, and performs the AND search in a subsequent Step S48.

In Step S52, it is determined whether the occupant has performed the destination determination operation, or not. If the determination is negative, the process returns to Step S46, and if the determination is positive, the process proceeds to Step S54. In Step S54, one destination determined on the basis of the destination determination operation performed by the occupant is determined.

Next, the advantages obtained by the second embodiment will be described. In the second embodiment, the occupant can perform the condition alleviation instruction. If the condition alleviation instruction has been made (yes in S46), a part of the multiple search condition acquired by the search condition acquisition unit 171 is missing to create the new combined search condition, and the AND search is performed under the new combined search condition (S48). The search result of the AND search is displayed on the display unit 150 (S50). The search results displayed in Step S50 are larger in the number of searches than the search results displayed in Step S44.

In the search result displayed in Step S44, there is a case in which the number of destination candidates is 0, and a case in which even if the number of destination candidates is one or more, the destination candidates are felt to be different from the expected destination. Even in those cases, with the execution of the condition alleviation instruction, the destination to which all of the multiple occupants can agree can be determined with less effort.

In Step S50, the missing search condition display fields 184 indicative of the combined search conditions used for search are displayed in correspondence with the respective search volume display fields 185 indicating the search result. The missing condition display fields 186 are also displayed. The occupant can easily determine that it is most effective to miss which of the search condition while viewing the display contents of the missing search condition display field 184 and the missing condition display fields 186. As a result, the respective occupants easily smoothly perform a discussion while viewing the screen displayed in Step S50.

(Third Embodiment)

Figure 10:
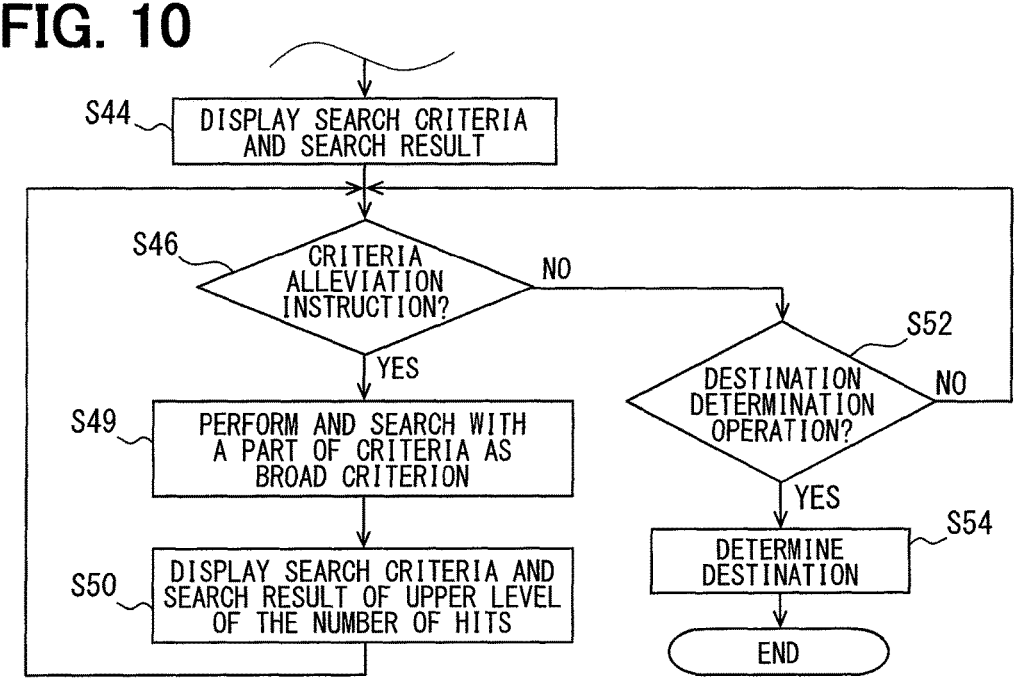
FIG. 10 is a flowchart illustrating a part of a process to be executed by an ECU of a vehicle navigation apparatus according to a third embodiment.

A third embodiment is similar to the second embodiment. In the third embodiment, a process illustrated in FIG. 10 is executed instead of the process illustrated in FIG. 8. FIG. 10 is different from FIG. 8 only in that Step S49 is executed instead of Step S48 in FIG. 8.

In Step S49, a part of the respective search condition included in the combined search condition created in Step S42 is changed to broad condition, that is, a broad sense as new combined search condition. An AND search is executed under the new combined search condition.

As an example of the broad condition, the search condition may be set as condition of a broader concept. For example, in a genre classification in which a genre "ramen" is included in a genre "Chinese", a change from "ramen" to "Chinese" that is a term of the broader concept means a change into a broad condition.

In addition, a condition added with a search condition similar to the search condition, that is, a similar condition means a broad condition. For example, the addition of the search condition of the price range such as "1000 yen to 3000 yen" to the search condition of the price range such as "up to 1000 yen" also means a change to the broad condition. The search condition such as "1000 yen to 3000 yen" is a similar condition of a broad target condition such as "up to 1000 yen".

In addition, in the case where genres "shopping mall" and "department store" are classified into the same hierarchy, the addition of "department store" that is the similar condition of "shopping mall" to "shopping mall" means a change to the broad condition.

Incidentally, as a technique for acquiring the AND search result under the combined search condition changed to the broad condition, there is a technique in which the AND search is performed under the combined search condition having "shopping mall" as the search condition, and aside from this AND search, the AND search is performed under the combined search condition in which "shopping mall" is changed to "department store". In this case, the search results of those two AND searches are combined together under OR condition.

As specific search condition, the broad condition corresponding to the search conditions are set in advance. The change to the broad condition is performed in Step S49 with the use of a correspondence set in advance.

Figure 11:
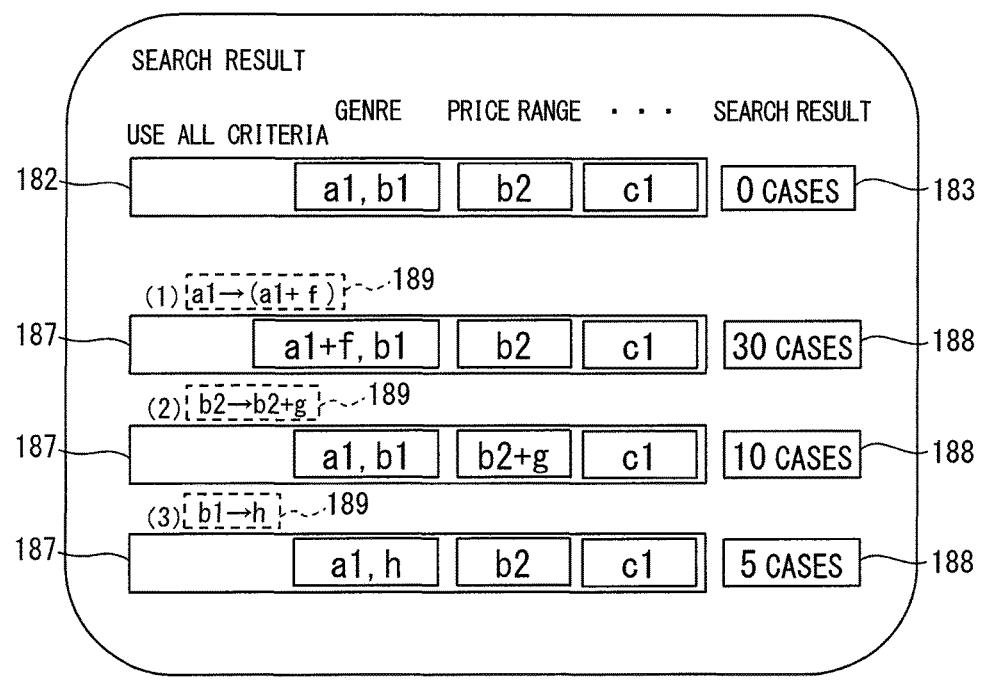
FIG. 11 is a diagram illustrating a display example in Step S50 of FIG. 10.

FIG. 11 illustrates a display example displayed on the display unit 150 in Step S50 in the third embodiment. In the display example of FIG. 11, broad search condition display fields 187 and search volume display fields 188 are displayed below an all-condition display field 182 and a search volume display field 183. Each of the broad search condition display fields 187 is a field for displaying the search condition performed in Step S49, and each of the search volume display fields 188 is a field for displaying the number of searches performed in the search condition shown in the corresponding broad search condition display field 187. As in the example of FIG. 9, in order to indicate the search condition and the number of searches in three searches larger in the number of destination candidates that meet the search condition, the broad search condition display fields 187 and the search volume display fields 188 are displayed three by three.

Further, broad condition display fields 189 are provided above the respective broad search condition display fields 187. Each of the broad condition display fields 189 indicates what the search condition broader than the search condition shown in the all-condition display field 182 is in the combined search condition shown in the corresponding broad search condition display field 187.

In the example of FIG. 11, an addition of a search condition f to a search condition a1 of the genre is shown in the top broad condition display field 189. An addition of a search condition g to a search condition b2 of the price range is shown in the middle broad condition display field 189. A broader conceptualization of a search condition b1 of the genre into a search condition h is shown in the bottom broad condition display field 189.

Next, the advantages obtained by the third embodiment will be described. In the third embodiment, a part of the search condition is changed to the broad condition, and the new combined search conditions are created to perform the AND search (S49). As in the second embodiment where a part of the search condition is missed, even if a part of the search condition is made broader, the number of condition is increased. Therefore, in the third embodiment, the same advantages as those in the second embodiment are obtained.

(Fourth Embodiment)

Figure 12:
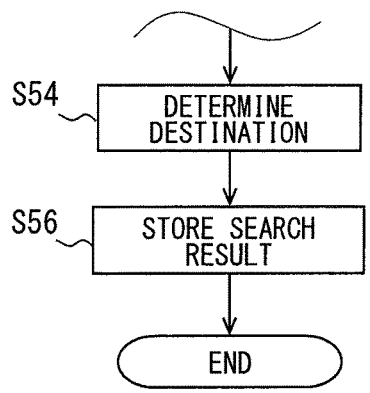
FIG. 12 is a flowchart illustrating a part of a process to be executed by an ECU of a vehicle navigation apparatus according to a fourth embodiment.

In a fourth embodiment, as illustrated in FIG. 12, Step S56 is executed after a destination has been determined (S54). In Step S56, the search result is stored in a storage unit 120 as a search history.

The search result includes combined search condition used for the destination determination, a destination determined in Step S54, and terminal IDs and difference condition of mobile terminals 200 that acquire destination search condition used for creation of the combined search condition. The difference conditions are exemplified by the search condition shown in the missing condition display fields 186 illustrated in FIG. 9 or the broad condition shown in the broad condition display fields 189 illustrated in FIG. 11.

Figure 13:
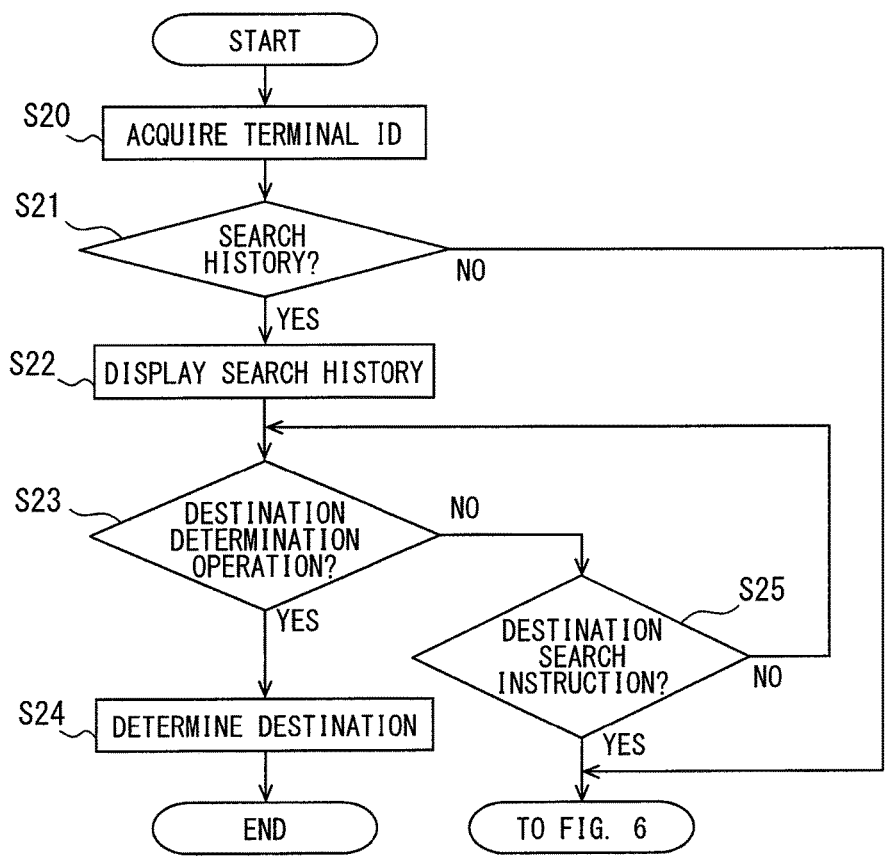
FIG. 13 is a flowchart illustrating a process to be executed by the ECU of the vehicle navigation apparatus before the process of FIG. 6 according to the fourth embodiment.

In addition, in the fourth embodiment, an ECU 170 of a vehicle navigation apparatus 100 executes a process illustrated in FIG. 13 before executing Step S30 and the subsequent steps illustrated in FIG. 6. In FIG. 13, Step S20 is executed by an identification information acquisition unit 176, Steps S21 and S22 are executed by a history output unit 177, Steps S23 and S24 are executed by a destination determination unit 174, and Step S25 is executed by a search unit 172.

In Step S20, the terminal IDs of the mobile terminals 200 are acquired from all of the mobile terminals 200 brought into the vehicle 300.

In Step S21, it is determined whether the search history that matches the terminal IDs acquired in Step S20 is stored in the storage unit 120, or not. In this example, the matching means perfect matching. In other words, when the multiple terminal IDs are included in one search history, if all of the multiple terminal IDs match the terminal IDs acquired in Step S20, it is assumed that the search history is present. If the determination in Step S21 is negative, the process proceeds to the process in FIG. 6 which has already been described.

On the other hand, if the determination in Step S21 is positive, the process proceeds to Step S22. In Step S22, the search history that matches the terminals IDs acquired in Step S20 among the search histories stored in the storage unit 120 is displayed on the display unit 150.

Figure 14:
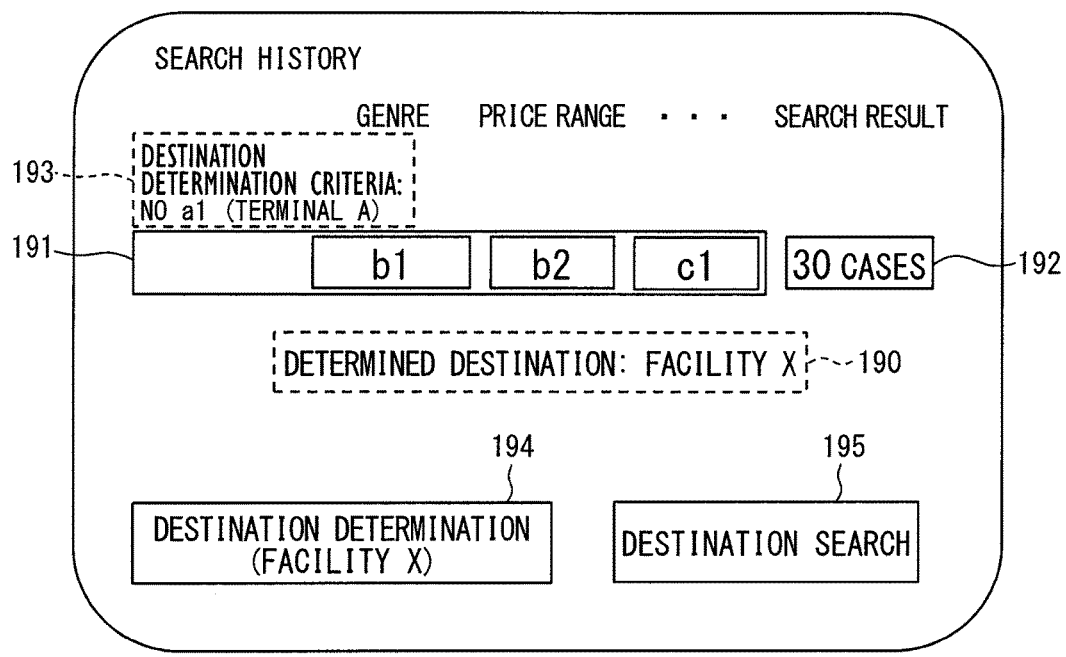
FIG. 14 is a diagram illustrating a display example in Step S22 of FIG. 13.

FIG. 14 illustrates a display example displayed in Step S22. In the display example of FIG. 14, the search history is displayed on a top of the screen. In detail, a destination display field 190, a search condition display field 191, a search volume display field 192, and a difference condition display field 193 are displayed on the top of the screen. The destination display field 190 is a field for displaying the destination, and the search condition display field 191 is a file for displaying the combined search condition used for the destination determination. The search volume display field 192 is a field for displaying the number of searches in the search performed under the combined search condition, and the difference condition display field 193 is a field for displaying the difference condition. A terminal name "terminal A" is also displayed in the difference condition display field 193. This indicates that the difference conditions are condition obtained by changing the destination search condition acquired from any mobile terminal 200.

Further, a destination determination button 194 that is operated by the occupant when determining the destination of the destination display field 190 as the current destination and a destination search button 195 that is operated by the occupant when giving an instruction on the execution of the process illustrated in FIG. 6 are displayed on a bottom of the screen.

In Step S23, it is determined whether the occupant has performed the destination determination operation, or not. The determination is performed on the basis of whether the destination determination button 194 displayed on the display unit 150 has been operated, or not. If the determination is positive, the process proceeds to Step S24. In Step S24, the destination displayed on the destination display field 190 of the display unit 150, that is, the destination set in the past is set as the current destination.

If the determination in Step S23 is negative, the process proceeds to Step S25. In Step S25, it is determined whether the occupant has performed a destination search instruction, or not. The determination is performed according to whether the destination search button 195 displayed on the display unit 150 has been operated, or not. If the determination is negative, the process returns to Step S23, and if the determination is positive, the process proceeds to S30 in FIG. 6.

Hereinafter, the advantages obtained by the fourth embodiment will be described. In the fourth embodiment, after the destination has been determined (S54), the search history including the determined destination and the terminal IDs of the mobile terminals 200 brought into the vehicle 300 are stored in the storage unit 120 in advance (S56).

When the destination search instruction has been performed since the next time, if the terminal IDs of the mobile terminals 200 brought into the vehicle 300 match the terminal IDs of the search history (yes in S21), the search history is displayed (S22).

If those terminal IDs match each other, all of the multiple occupants who get on the vehicle 300 at the present time are likely to match the occupants when determining the destination included in the search history. If all of the occupants are the same, if the destination included in the search history is displayed, there is also the possibility of setting the destination as the destination of the route guidance this time. Under the circumstances, in the fourth embodiment, if the terminal IDs of the mobile terminals 200 brought into the vehicle 300 match the terminal IDs included in the search history, the search history is displayed.

When the occupant determines that this destination may be also acceptable this time while viewing the destination displayed in the destination display field 190, the occupant can determine the destination without performing the destination search. Therefore, the destination to which the multiple occupants can agree can be determined with less effort.

In addition, the difference conditions are included in the search history displayed on the display unit 150. The difference conditions are displayed in the difference condition display field 193. With the display of the difference condition, it is found that when the multiple occupants who get on the vehicle 300 this time has determined the destination in the past, the destination has been determined under the combined search condition in which any search condition has been changed. The difference condition mean that when the multiple occupants who get on the vehicle 300 this time has determined the destination in the past, whose search condition is changed.

Further, the terminal name indicating that the difference condition is the condition obtained by changing the destination search condition acquired from any mobile terminal 200 is displayed in the difference condition display field 193. With the displayed terminal name, it is clearly found that when the destination has been determined in the past, whose search condition have been changed.

With the above configuration, if the destination search is performed this time (yes in S25), a discussion can be smoothly advanced such that the destination is to be determined this time with the employment of the combined search condition in which the search condition of another occupant who is different from an occupant who has determined the destination in the past has been changed. Even with the above configuration, the destination to which the multiple occupants can agree can be determined with less effort.

(Fifth Embodiment)

Figure 15:
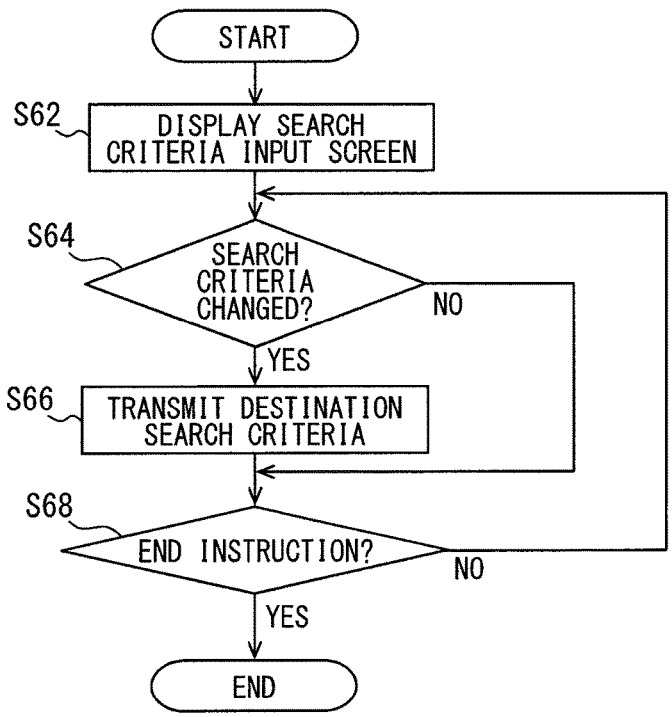
FIG. 15 is a flowchart illustrating a process to be executed by a computer of a mobile terminal according to a fifth embodiment.
Figure 16:
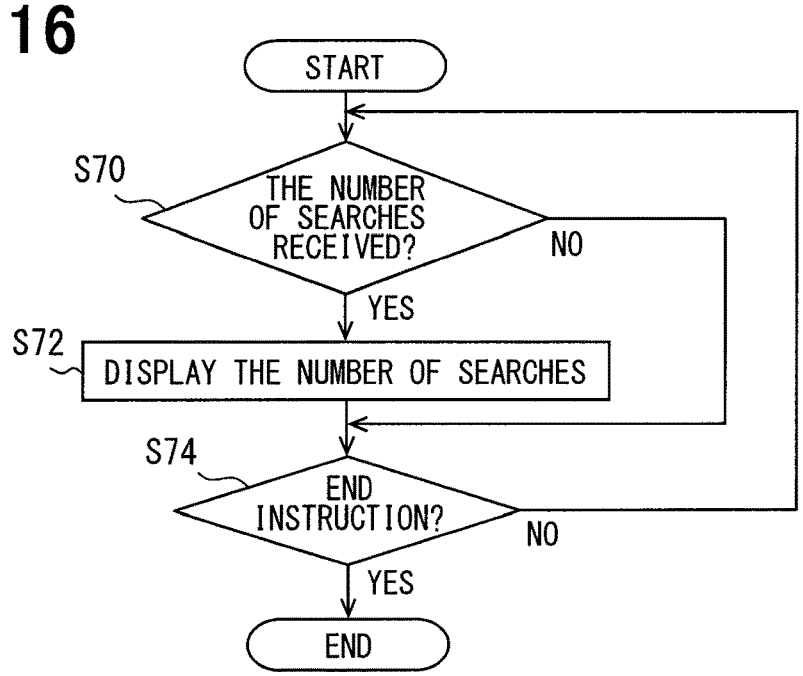
FIG. 16 is a flowchart illustrating a process to be executed by the computer in parallel to the process of FIG. 15.

In a fifth embodiment, a computer 270 of each mobile terminal 200 executes processes of FIGS. 15 and 16 instead of the process in FIG. 4. The processes in FIGS. 15 and 16 are processed in parallel. In the parallel process, if the computer 270 has multi-cores, separate CPUs perform the respective processes in FIGS. 15 and 16. If the computer 270 has a single core, the computer 270 performs the parallel process through time division processing.

Figure 17:
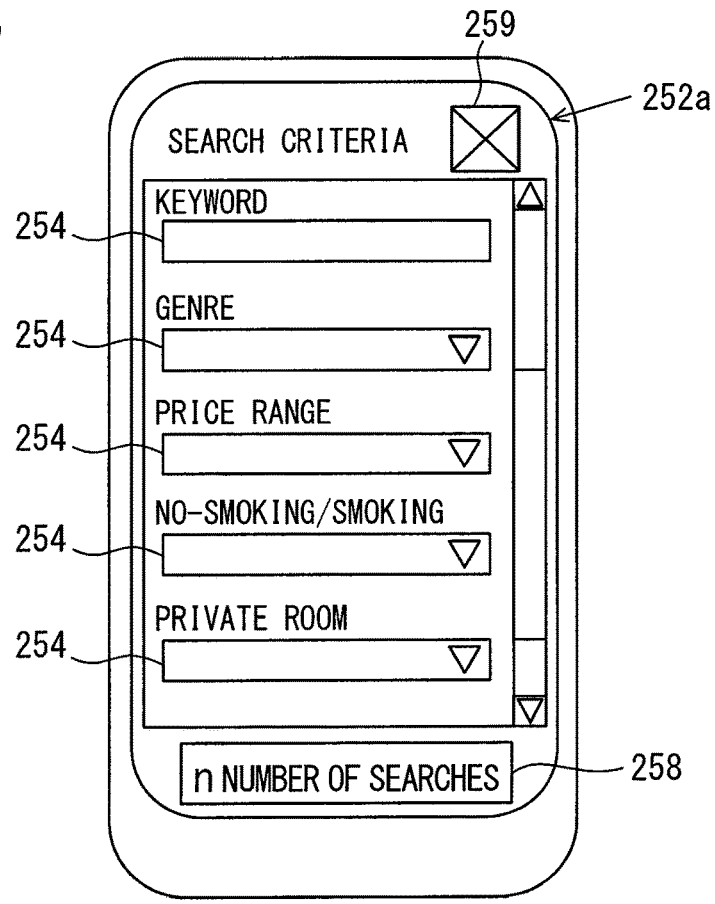
FIG. 17 is a diagram illustrating a display example in Step S62 of FIG. 15 and Step S72 of FIG. 16.

First, the process in FIG. 15 will be described. In Step S62, a search condition input screen 252a is displayed in Step S62. FIG. 17 illustrates an example of the search condition input screen 252a according to the fifth embodiment.

The search condition input screen 252a illustrated in FIG. 17 is different from the search condition input screen 252 illustrated in FIG. 5 in that a search execution button 256 in FIG. 5 is not displayed, but a search volume display field 258 and an end button 259 are displayed instead in the search condition input screen 252a.

After the search condition input screen 252a has been displayed in Step S62, it is determined in Step S64 whether the search condition have been changed, or not. If any one of the search condition has been changed in the multiple condition input fields 254 displayed on the search condition input screen 252a, the determination in Step S64 is positive. If the determination in Step S64 is positive, the process proceeds to Step S66. In Step S66, the changed destination search condition, that is, all of the set multiple search conditions are transmitted to the vehicle navigation apparatus 100.

The vehicle navigation apparatus 100 performs the destination search every time receiving the destination search condition, and transmits the number of searches that meet the combined search condition to the mobile terminals 200. The process of the vehicle navigation apparatus 100 will be described with reference to FIG. 18 in detail later.

When Step S66 has been executed, or when the determination in Step S64 is negative, Step S68 is executed. In Step S68, it is determined whether the end button 259 has been operated, or not. In other words, in Step S68, it is determined whether the end has been instructed, or not. If the determination is negative, the process returns to Step S64, and if the determination is positive, the process in FIG. 15 is completed.

Subsequently, the process in FIG. 16 will be described. In Step S70, it is determined whether the number of searches has been received from the vehicle navigation apparatus 100, or not. If the determination is positive, the process proceeds to Step S72.

In Step S72, the number of searches received from the vehicle navigation apparatus 100 is displayed in the search volume display field 258.

If the number of searches displayed in the search volume display field 258 becomes 0, each of the occupants who operate the mobile terminals 200 can determine that some search condition should be deleted, or some search condition should be changed to broad condition. On the contrary, when the number of searches displayed in the search volume display field 258 is large, the occupant can determine the search condition should be added, or some search condition should be changed to narrow search condition. In other words, the occupant can adjust the search condition while viewing the number of searches displayed in the search volume display field 258.

When the number of searches displayed in the search volume display field 258 becomes a suitable number, the occupant may view the search result displayed on the display unit 150 of the vehicle navigation apparatus 100. If the destination to which the multiple occupants can agree can be determined while viewing the search result, the occupant operates the end button 259.

In Step S74 executed when the determination in Step S70 is negative, and when Step S72 has been executed, it is determined whether the end button 259 has been operated, or not. In other words, in Step S74, it is determined whether the end has been instructed, or not. If the determination is negative, the process returns to Step S70, and if the determination is positive, the process in FIG. 16 is completed.

Figure 18:
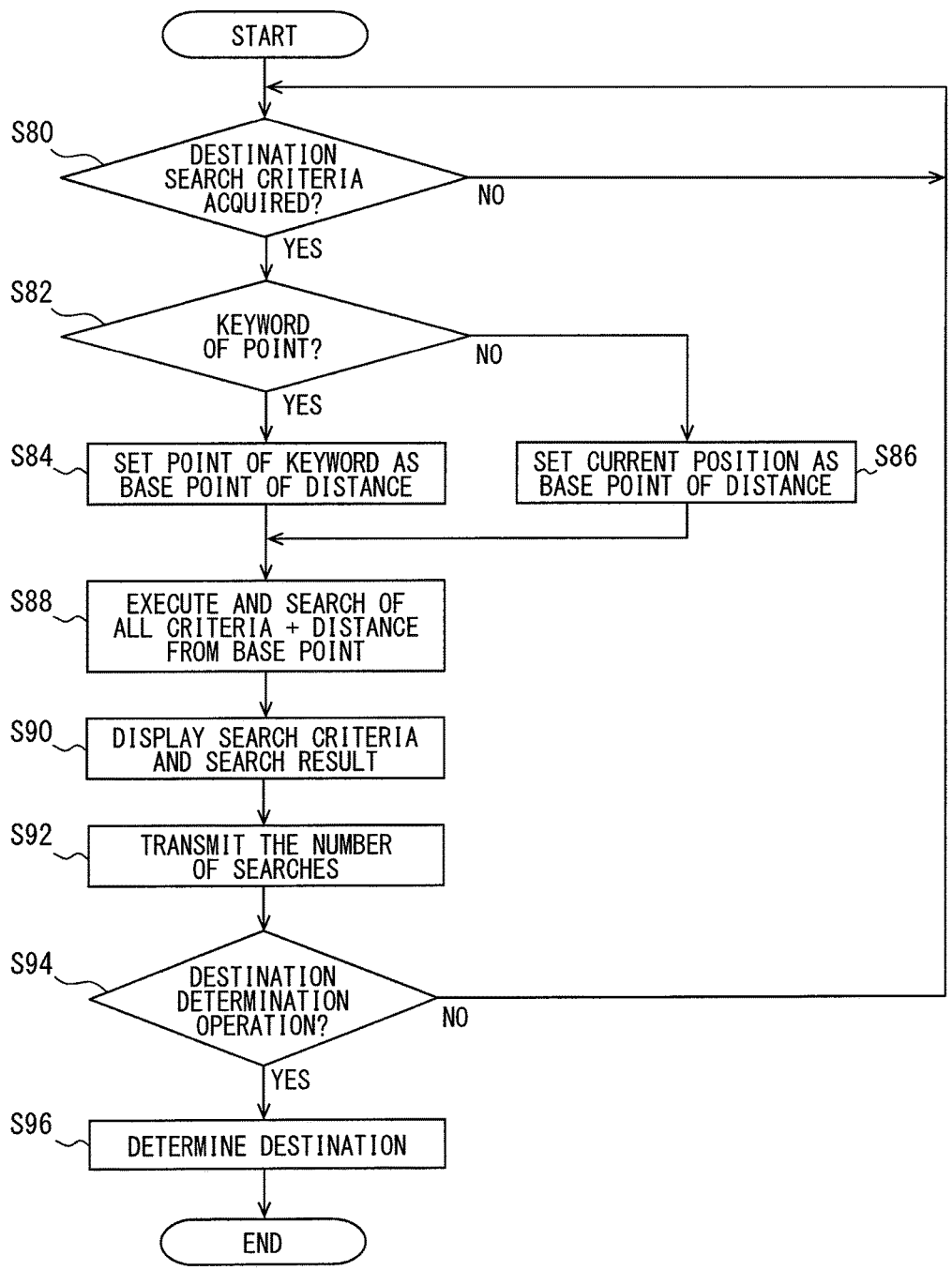
FIG. 18 is a flowchart illustrating a process to be executed by an ECU of a vehicle navigation apparatus according to the fifth embodiment.

In the fifth embodiment, the ECU 170 of the vehicle navigation apparatus 100 executes a process in FIG. 18 instead of the process in FIG. 6. In Step S80, it is determined whether the destination search condition have been acquired from any mobile terminal 200, or not. If the determination is negative, Step S80 is repeated, and if the determination is positive, the process proceeds to Step S82.

Steps S82 to S90 are identical with Steps S36 to S44 in FIG. 6, respectively. In Step S92, the number of searches obtained in Step S88 is transmitted to all of the mobile terminals 200 brought into the vehicle 300.

In subsequent Step S94, it is determined whether the occupant has performed the destination determination operation, or not. If the determination is negative, the process returns to Step S80, and if the determination is positive, the process proceeds to Step S96. In Step S96, one destination specified on the basis of the destination determination operation performed by the occupant is determined.

Hereinafter, the advantages obtained by the fifth embodiment will be described. In the fifth embodiment, each of the mobile terminals 200 transmits the destination search condition to the vehicle navigation apparatus 100 every time the search conditions are changed (S66), and the ECU 170 of the vehicle navigation apparatus 100 performs the destination search every time acquiring the destination search condition, and transmits the number of searches to the mobile terminals 200 (S80 to S92). The number of searches transmitted from the vehicle navigation apparatus 100 is displayed on the display unit 250 of the mobile terminals 200 (S72).

The respective occupants who operate the mobile terminals 200 can successively view the number of searches every time the search conditions are changed, and can adjust the search condition while viewing the number of searches. As a result, the search result in which the number of searches are appropriate, and the destination is easily determined by performing a discussion can be rapidly obtained.

It is noted that a flowchart or the processing of the flowchart in the present application includes sections (also referred to as steps), each of which is represented, for instance, as S2. Further, each section can be divided into several sub-sections while several sections can be combined into a single section. Furthermore, each of thus configured sections can be also referred to as a device, module, or means.

Each or any combination of units explained in the above can be achieved as (i) a software unit in combination with a hardware unit (e.g., computer) or (ii) a hardware unit, including or not including a function of a related apparatus; furthermore, the hardware unit (e.g., integrated circuit, hard-wired logic circuit) may be constructed inside of a microcomputer.

The embodiments of the present disclosure have been described above. However, the present disclosure is not limited to the above-described embodiments, and the following modifications also fall within the technical scope of the present disclosure. Further, the present disclosure can be implemented with various changes without departing from the spirit of the present disclosure, aside from the following modifications.

(Modification 1)

In Step S42 of the first embodiment, the combined search condition is created with the addition of the condition in which the distance from the base point falls within the first distance. However, when the route guidance unit 175 performs the route guidance, the combined search condition may be created by addition of a condition in which the distance from the base point falls within a second distance from the guide route instead of the condition in which the distance from the base point falls within the first distance. The distance from the guide route is not a linear distance, but a distance of a route that is separated from the guide route and arrives at the destination candidate. The second distance is set in advance, or the occupant may change the distance.

(Modification 2)

Different from the above-mentioned embodiments and the modification 1, the combined search condition may be created without any addition of the condition in which the distance from the base point falls within the first distance, or the condition in which the distance from the base point falls within the second distance from the guide route.

(Modification 3)

The search result is displayed on the display unit 150 of the vehicle navigation apparatus 100, and the search result may be displayed on the display unit 250 of the mobile terminals 200.

(Modification 4)

In the second and third embodiments, if the condition alleviation instruction has been made (yes in S46), a part of the condition is missed, or a part of the condition is changed to the broad condition. However, without being limited to this configuration, when the number of searches in the destination search is a minimum number or lower, a part of condition may be automatically missed, or a part of condition may be automatically changed to the broad condition to again execute the destination search (modification 4). In that case, the search result in which the number of searches in the destination search is the minimum number or lower may not be displayed.

(Modification 5)

In the fourth embodiment, if the determination result in Step S25 is positive, the process in FIG. 6 is executed. Instead, the process may proceed to Step S44 in FIG. 8 or 10. In Step S44, the search result screen under the combined search condition displayed in the search condition display field 191 is displayed. In this example, the displayed search result screen may be identical with that in FIG. 7.

If all of the multiple occupants who get on the vehicle 300 this time are identical with the occupants when the destination included in the search history has been determined, even if the destination included in the search history is not set to the current destination, the search is likely to be performed under the same combined search condition. Under the circumstances, if the determination result in Step S25 is positive, the search result screen under the combined search condition displayed in the search condition display field 191 is displayed.

With the above configuration, the respective occupants can set another destination that meets the same combined search condition as the previous one as the current destination while omitting the effort to again input the same destination search condition. In addition, an effort to the final destination determination can be reduced this time even as the combined search conditions are alleviated.

Since the occupant may want to perform the search under entirely different destination search condition this time, even if the process proceeds to FIGS. 8 and 10, when the search conditions are acquired from the multiple mobile terminals 200, it is preferable to execute Step S36 in FIG. 6.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A destination determination device for a vehicle, used for the vehicle, the destination determination device comprising:

a communication unit that performs a wireless communication with a plurality of mobile terminals used by an occupant in the vehicle and having a destination search function; and an electronic control unit configured to comprise:

a search condition acquisition unit that acquires a plurality of destination search conditions from each of the plurality of mobile terminals through the communication unit;

a search unit that performs a destination search based on an AND search of a combined search condition in which a plurality of acquired destination search conditions are combined together when the search condition acquisition unit acquires the plurality of destination search condition;

a search result output unit that outputs a search result of the destination search performed by the search unit under the combined search condition; and a route guidance unit that performs a route guidance to drive the vehicle along a guide route to a set destination, wherein the search unit adds a condition of a distance into the destination search conditions acquired by the search condition acquisition unit to create the combined search condition, the search unit sets the condition of the distance in which the distance from a base point is equal to or smaller than a first distance, and the search unit sets the condition of the distance in which the distance from the guide route is equal to or smaller than a second distance when the route guidance unit performs the route guidance.

2. The destination determination device for the vehicle according to claim 1, wherein:

the search unit performs the AND search in which all of the destination search conditions acquired by the search condition acquisition unit are included in the combined search condition, and further performs the AND search in which the combined search condition is generated by omitting a part of the destination search conditions acquired by the search condition acquisition unit.

3. A destination determination device for a vehicle, used for the vehicle, the destination determination device comprising:

a communication unit that performs a wireless communication with a plurality of mobile terminals used by an occupant in the vehicle and having a destination search function; and an electronic control unit configured to comprise:

a search condition acquisition unit that acquires a plurality of destination search conditions from each of the plurality of mobile terminals through the communication unit;

a search unit that performs a destination search based on an AND search of a combined search condition in which a plurality of acquired destination search conditions are combined together when the search condition acquisition unit acquires the plurality of destination search condition; and a search result output unit that outputs a search result of the destination search performed by the search unit under the combined search condition, wherein:

the search unit performs the AND search in which all of the destination search conditions acquired by the search condition acquisition unit are included in the combined search condition, and further performs the AND search in which the combined search condition is generated by broadening a sense of a part of the destination search conditions acquired by the search condition acquisition unit;

the search unit broadens the sense by determining a similar condition that is similar to a broadening sense target condition as a condition for a broadening sense target, the similar condition provides to add, a numerical range around the destination search condition or another term classified into a same hierarchy of the destination search condition, to the destination search condition;

the search unit performs the AND search using the similar condition in place of the broadening sense target condition to obtain another search result; and the search unit adds the another search result as the search result of the destination search.

4. The destination determination device for the vehicle according to claim 2, wherein:

the search result output unit outputs the search result of the destination search in association with the combined search condition used for the destination search.

5. A destination determination device for a vehicle, used for the vehicle, the destination determination device comprising:

a communication unit that performs a wireless communication with a plurality of mobile terminals used by an occupant in the vehicle and having a destination search function; and an electronic control unit configured to comprise:

a search condition acquisition unit that acquires a plurality of destination search conditions from each of the plurality of mobile terminals through the communication unit;

a search unit that performs a destination search based on an AND search of a combined search condition in which a plurality of acquired destination search conditions are combined together when the search condition acquisition unit acquires the plurality of destination search condition;

a search result output unit that outputs a search result of the destination search performed by the search unit under the combined search condition;

an identification information acquisition unit that acquires identification information of each of the plurality of mobile terminals from which the destination search conditions are obtained;

a destination determination unit that determines a destination based on the search result of the destination search output by the search result output unit and a destination determination operation of the occupant in the vehicle;

a search history storage unit that stores the destination determined by the destination determination unit in association with the identification information of each of the plurality of mobile terminals from which the destination search conditions, used for the destination search, are obtained; and a history output unit that outputs the destination associated with the identification information of a matched mobile terminal when the identification information of one of the plurality of mobile terminals acquired by the identification information acquisition unit matches the identification information of one of the plurality of mobile terminals stored in the search history storage unit.

6. The destination determination device for the vehicle according to claim 5, wherein:

the search history storage unit stores a difference condition indicative of a difference between the combined search condition used for the destination search output by the search result output unit and a case in which all of the destination search conditions acquired by the search condition acquisition unit are included in the combined search condition, in addition to the destination determined by the destination determination unit and the identification information of each of the plurality of mobile terminals from which the destination search conditions, used for the destination search, are obtained; and when the identification information of one of the plurality of mobile terminals acquired by the identification information acquisition unit matches the identification information of one of the plurality of mobile terminals stored in the search history storage unit, the history output unit outputs the destination and the difference condition associated with the identification information of a matched mobile terminal.

7. A destination determination system for a vehicle comprising:
a destination determination device; and
a plurality of mobile terminals, wherein:
the destination determination device includes:
a communication unit that performs a wireless communication with the plurality of mobile terminals used by an occupant in the vehicle and having a destination search function;
an electronic control unit that is configured to comprise:
a search condition acquisition unit that acquires a plurality of destination search conditions from each of the plurality of mobile terminals through the communication unit;
a search unit that performs a destination search based on an AND search of a combined search condition in which a plurality of acquired destination search conditions are combined together when the search condition acquisition unit acquires the plurality of destination search condition;
a search result output unit that outputs a search result of the destination search performed by the search unit under the combined search condition; and
a route guidance unit that performs a route guidance to drive the vehicle along a guide route to a set destination, wherein the search unit adds a condition of a distance into the destination search conditions acquired by the search condition acquisition unit to create the combined search condition, the search unit sets the condition of the distance in which the distance from a base point is equal to or smaller than a first distance, and
the search unit sets the condition of the distance in which the distance from the guide route is equal to or smaller than a second distance when the route guidance unit performs the route guidance;
each of the plurality of mobile terminals transmits the destination search conditions to the destination determination device every time receiving the destination search conditions;
the search unit of the destination determination device performs the destination search every time the search condition acquisition unit acquires the destination search conditions;
the search result output unit of the vehicle destination determination device outputs a numerical number of searches obtained by the destination search to each of the plurality of mobile terminals through the communication unit every time the search unit performs the destination search; and
each of the plurality of mobile terminals includes a display unit, and displays the numerical number of received searches on the display unit every time receiving the numerical number of searches.

* * * * *